(12) United States Patent
Ortiz et al.

(10) Patent No.: US 6,694,320 B1
(45) Date of Patent: Feb. 17, 2004

(54) BRANDING DYNAMIC LINK LIBRARIES

(75) Inventors: Julio Ortiz, Newark, CA (US); Stephen G. Marth, San Ramon, CA (US); David R. Ronca, San Jose, CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/260,391

(22) Filed: Mar. 1, 1999

(51) Int. Cl.$^7$ ................................................. G06F 7/00
(52) U.S. Cl. ........................ 707/101; 707/10; 707/102; 717/106; 717/120; 345/716; 345/762
(58) Field of Search ............................... 707/1–10, 100, 707/510, 513; 715/510, 513; 717/120, 106; 345/700, 716, 762

(56) References Cited

U.S. PATENT DOCUMENTS

| | | | |
|---|---|---|---|
| 5,138,712 A | * 8/1992 | Corbin .......................... 705/59 |
| 5,349,636 A |   9/1994 | Irribarren |
| 5,471,925 A | * 12/1995 | Heinrich et al. ............. 705/408 |
| 5,490,088 A | *  2/1996 | Landis et al. .................... 707/1 |
| 5,526,407 A | *  6/1996 | Russell et al. ............... 707/541 |
| 5,530,740 A |   6/1996 | Irribarren et al. |
| 5,737,395 A |   4/1998 | Irribarren |
| 5,797,139 A | *  8/1998 | Amro ........................... 707/100 |
| 5,841,966 A |  11/1998 | Irribarren |
| 5,864,850 A | *  1/1999 | Nordman ...................... 707/10 |
| 5,907,843 A | *  5/1999 | Cleron et al. .................. 707/10 |
| 5,918,214 A | *  6/1999 | Perkowski ..................... 705/25 |
| 5,933,841 A | *  8/1999 | Schumacher et al. ........ 707/501 |
| 5,974,257 A | * 10/1999 | Austin .......................... 717/125 |
| 5,983,369 A | * 11/1999 | Bakoglu et al. ............... 714/46 |
| 5,995,102 A | * 11/1999 | Rosen et al. ................. 345/339 |
| 6,037,928 A | *  3/2000 | Nachinson et al. .......... 345/156 |
| 6,118,449 A | *  9/2000 | Rosen et al. ................. 707/513 |
| 6,144,960 A | * 11/2000 | Okada et al. ................... 707/10 |
| 6,173,277 B1 | *  1/2001 | Ashby et al. ................... 707/1 |
| 6,182,275 B1 | *  1/2001 | Beelitz et al. ............... 717/175 |
| 6,201,538 B1 | *  3/2001 | Wugofski ..................... 345/716 |
| 6,269,441 B1 | *  7/2001 | Lee et al. ....................... 713/1 |
| 6,300,948 B1 | * 10/2001 | Geller et al. ................. 345/866 |
| 6,338,149 B1 | *  1/2002 | Ciccone, Jr. et al. ......... 714/38 |
| 6,509,913 B2 | *  1/2003 | Martin et al. ................ 345/762 |
| 6,542,160 B1 | *  4/2003 | Abgrall ....................... 345/537 |

OTHER PUBLICATIONS

Charles Petzold, "Programming Windows", pubd. 1988, Microsoft Press, pp. 9–10, 14–17, 25–28, 281–321.

* cited by examiner

Primary Examiner—Kim Vu
Assistant Examiner—Anh Ly
(74) Attorney, Agent, or Firm—Beyer Weaver & Thomas, LLP

(57) ABSTRACT

Techniques for centralized management of branding information for computer products are disclosed. The techniques are particularly well suited for use with software application to display branding information for various hardware and/or software components being utilized by the software application.

23 Claims, 3 Drawing Sheets

BRANDING DYNAMIC LINK LIBRARIES

FIELD OF THE INVENTION

The present invention provides for centralized management of branding information for a computer product. The present invention is particularly well suited for use with a software application to display branding information for various hardware and/or software components being utilized by the software application.

BACKGROUND OF THE INVENTION

Marking products with company logos and/or trademarks is common practice. In the computer industry, hardware and software components used to form a computer product often have associated trademarks and are often supplied by a number of different companies. These hardware and software components for the most part remain unseen to end users. Notwithstanding this, it is still desired to present company logos and trademarks associated with the hardware and software components. To achieve this, branding data providing product and/or company names is sometimes included with the hardware and software components. The branding data associated with each hardware and software component is typically stored in a separate file in memory. Unfortunately, since the branding data for the various hardware and software components is stored in separate files, the branding data is time consuming to access and difficult to update especially when it is necessary to access branding data associated with multiple components.

Thus there is a need for improved techniques to manage branding data in a computer product.

SUMMARY OF THE INVENTION

The present invention provides for centralized management of branding information for a computer product. The present invention is particularly well suited for use with software application to display branding information for various hardware and/or software components being utilized by the software application.

According to one aspect of the present invention there is provided a method for managing branding data within a computer product. The method includes the operations of: storing branding information associated with the computer product in a central library; and storing at least one routine to access the branding information in at least one second library, the at least one routine being called by a software application requesting branding data and extracting the appropriate branding data from the central library in response to the call.

According to another aspect of the present invention there is provided a method of accessing branding data stored within a computer product in response to a request from a software application. The method includes the operations of: linking to a first library storing routines to access branding data stored in a central library in response to the request; calling the routines in the first library, the called routines loading the central library and extracting branding data from the central library identified in the request; and conveying the extracted branding data to the software application.

In one embodiment, the central and first libraries are dynamic link libraries. The branding data can include product names, original equipment manufacturer (OEM) names and images. The branding data can be stored in a version resource in the central library and can include string resources for the product names and OEM names. The images can also be stored in the version resource in bitmap resources.

According to another aspect of the present invention there is provided a computer readable medium including computer program code for accessing branding data stored in a central resource. The computer readable medium includes: computer program code for receiving a branding data request from a software application; computer program code for assessing the central resource to retrieve pertinent branding data based on the branding data request; and computer program code for conveying the pertinent branding data to the software application in response to the branding data request.

The present invention provides advantages in that the branding data is kept in a compact form, which can be easily accessed and updated. As a result, it is a simple and direct procedure to add new procedures and branding data and to alter existing procedures and branding data.

BRIEF DESCRIPTION OF THE DRAWINGS

An embodiment of the present invention will now be described more fully with reference to the accompanying drawing in which.

DETAILED DESCRIPTION OF THE INVENTION

As mentioned previously, it is often desired to present company logos and trademarks associated with hardware and software components embodied in a computer product on a display and/or graphical user interface. Computer product within the context of this application refers to virtually any product including a processing unit executing software code.

Figure 1:
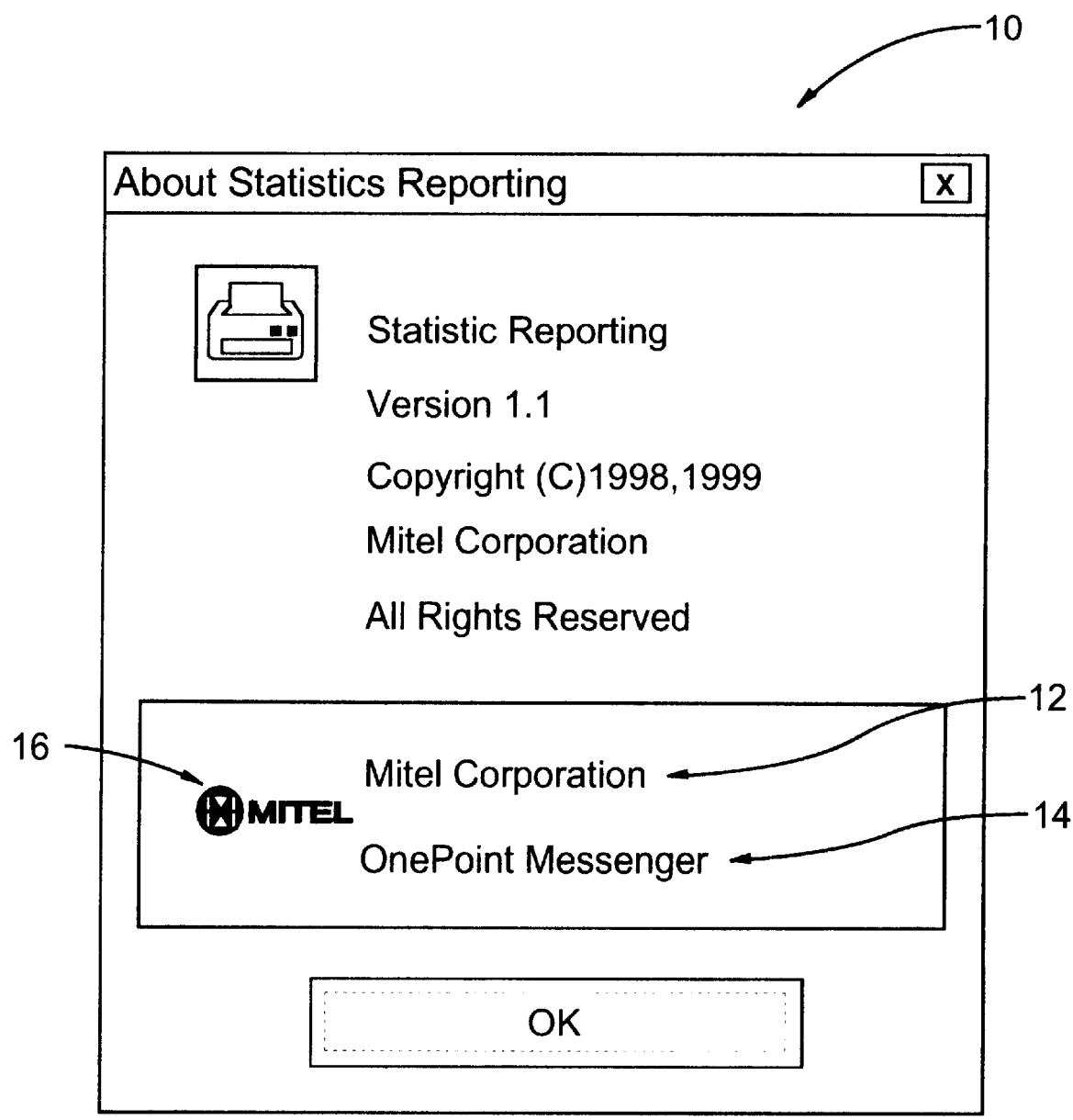
FIG. 1 illustrates a window displaying branding information.
Figure 2A:
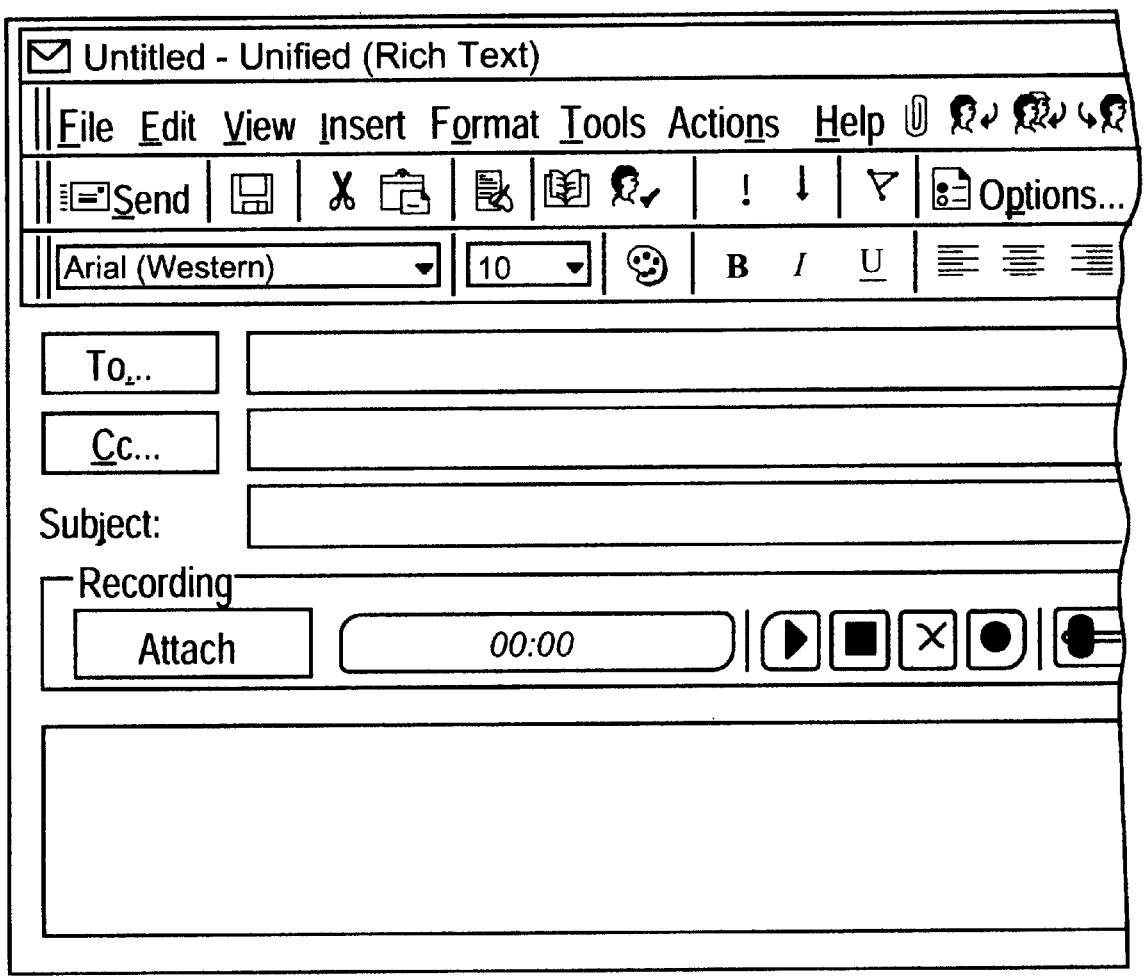
FIGS. 2a and 2b illustrate another window displaying branding information.
Figure 2B:
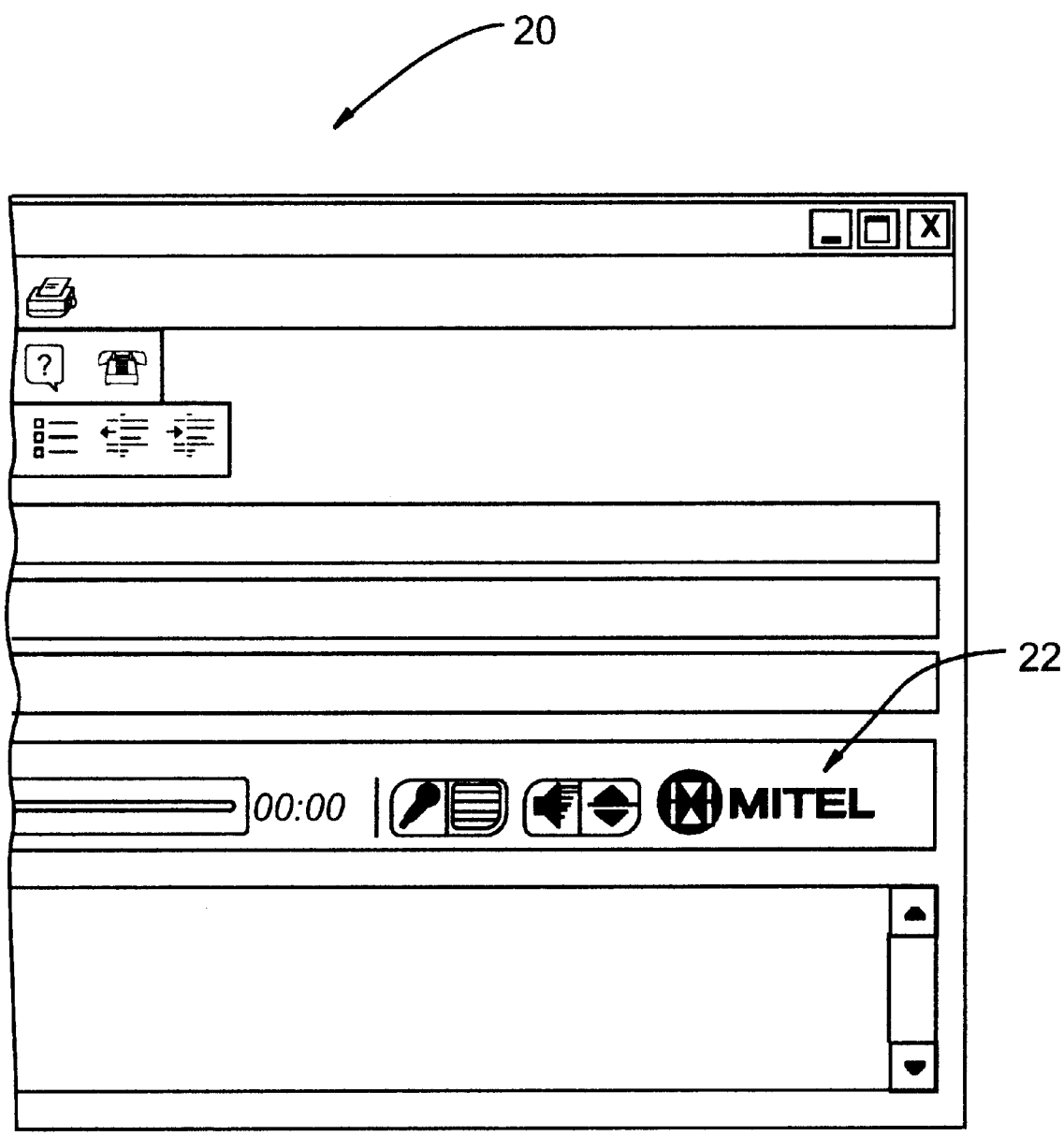

The present invention provides for centralized management of branding information for a computer product. The present invention is particularly well suited for use with a software application to display branding information for various hardware and/or software components being utilized by the software application. FIGS. 1, 2a and 2b illustrate windows displaying branding information.

FIG. 1 is a screen shot of an About window from a representative computer product. Here, the computer product is a software application pertaining to statistics reporting known as "One Point Messenger" by Mitel Corporation of Ottawa, Ontario, Canada. Here, "One Point Messenger" is a product name 12, and Mitel Corporation is the name 14 of the company that produced the product. The company name 14 can refer to an Original Equipment Manufacturer (OEM) for the product (e.g., Mitel Corporation). The company logo 16 for Mitel Corporation is also provided. Thus, the About window provides important branding information for the computer product. The product name 12, the company name 14 and the company logo 16 represent the branding information being displayed.

FIG. 2 is a screen shot of an application window including a compose form for composing unified messages in a messaging system. Besides the typical areas for buttons and text entry fields, the form also illustrates a company logo 22. The company logo 22 represents the branding information being displayed in form 20. Thus, branding information can be provided on useful areas of the computer product (e.g., software applications) which are typically displayed to users. As is apparent from the Figures the branding information appears in non-modifiable fields of the form.

As will be appreciated, hardware and software components within the computer product may have trademarks associated with them and/or may be produced by different companies. The different companies can pertain to the various hardware and software components. Often, many of the different companies are Original Equipment Manufacturers (OEMs). As a result these hardware and software components may have associated branding data.

To facilitate access to branding data, the present invention provides software to manage branding data in a computer product. The software makes use of dynamic link libraries (DLLs), which provide a simple and compact procedure for software applications to access required branding data. Specifics of the branding data software will now be described.

In order to manage branding data, two DLLs are created, namely cvBrand.DLL and cvOEMBrand.DLL. cvBrand.DLL holds a number of routines which are called in response to a request for branding data made by a software application to access branding data. cvOEMBrand.DLL holds the actual branding data. Thus, all branding data is stored in a single central location. In the present embodiment, the cvOEMBrand.DLL includes a version resource with string resources in English UNICODE. The string resources include product name strings, OEM name strings and bitmaps of branding images.

In the present embodiment, the cvBrand.DLL holds four routines, namely a BOOL getProductName routine, a BOOL getOEMName routine, a BOOL getImage routine and a BOOL getName routine. Appendix A illustrates the variables associated with these routines. These four routines when called in response to a request for branding data allow product name, OEM name and image branding data to be loaded from the cvOEMBrand.DLL. When the branding data is loaded by cvBrand.DLL, the branding data can be accessed by the requesting software application. As will be appreciated, since the branding data is accessed by making DLL function calls, the branding data retrieval process is simple and can be carried out quickly.

In operation, when a software application requires branding data, the software application dynamically or statically links to the cvBrand.DLL and calls the routines of the cvBrand.DLL to access the appropriate product name, OEM name and product image branding data from the cvOEMBrand.DLL. Once the cvOEMBrand.DLL is accessed, the branding data is extracted by the cvBrand.DLL and is conveyed to the software application.

When the BOOL getProductName routine is called, the routine makes a getName call with the variable ntName set to ID_PRODUCT identifying the product name for which branding data is required. This call is used by the BOOL getName routine as will be described.

When the BOOL getOEMName routine is called, the routine also makes a getName call with the variable ntName set to ID_OEM identifying that OEM branding data is required. This call is also used by the BOOL getName routine as will be described.

When the BOOL getImage routine is called, a standard LoadLibrary call is made to load the cvOEMBrand.DLL simply using an unpathed filename. If the cvOEMBrand.DLL is not loaded in response to the call, the getimage routine identifies the correct path by using a GetModuleFileName call to identify where the cvOEMBrand.DLL is located. The getimage routine replaces the cvOEMBrand.DLL name with the pathed name OEM_DLL_FNAME, which identifies the OEM DLL filename and tries to load the cvOEMBrand.DLL using the pathed name. If the cvOEMBrand.DLL is still not loaded, a message box announces an error message and the getImage routine returns a value of FALSE.

If the LoadLibrary call does not return a value of FALSE, the getImage routine next calls a second standard LoadImage routine to load a requested logo, as determined by the iiImageID variable from the cvOEMBrand.DLL. A standard FreeLibrary routine then releases the cvOEMBrand.DLL. If the LoadImage routine does not return a value of FALSE, the "phIMageHandle" variable is set to point to the value returned by the LoadImage routine.

When getProductName and getOEMName routines make getName calls, the BOOL getName routine is called. When the getName routine is called, the getName routine firstly checks if wLangID=0 and if so, sets wLangID to the systems default Language ID; otherwise it uses the given value. Next, a request to the cvOEMBrand.DLL version resource is prepared.

If ntName is ID_PRODUCT and the buffer_size variable is large enough to hold the maximum allowed product name (as determined by variable MAX_PRODUCT_NAME_LENGTH), then a request string cTmpStr is written to find a ProductName string (using wLangID). In the preferred embodiment, the buffer_size variable is set to 32 characters. If the request string is unable to find the ProductName string, the request string is set to point to a default failure string MISSING_PRODUCT_NAME string, currently set to "[]".

If ntName is ID_OEM and the buffer_size variable is large enough to hold the maximum allowed OEM name (as determined by variable MAX_OEM_NAME_LENGTH), then a request string cTmpStr is written to find an OEMName string (using wLangID). In the preferred embodiment, the buffer_size variable is set to 32 characters. If the request string is unable to find the OEMName string, the request string is set to point to a default failure string MISSING_OEM_NAME string, currently set to "[]".

The getName routine then reads the appropriate string from the cvOEMBrand.DLL version resource. During the read, the getName routine retrieves information such as the version information size (variable dwVerSize) using a GetFileVersionInfoSize routine stored in a standard version.lib library, extracts a copy of the version resource into an lpData variable using a GetFileVersionInfo routine from the version.lib library, and uses the cTmpStr request string to copy a correct string value into the lpData variable via a VerQueryValue routine from version.lib library. If the string is correctly extracted, the string is copied into the buffer variable.

The getName routine returns a value of TRUE unless ntName is neither ID_PRODUCT or ID_OEM or if the buffer_size variable is not large enough to hold the entire string name.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although a preferred embodiment of the present invention has been described, those skilled in the art will appreciate that variations and modifications may be made without departing from the spirit and scope thereof as defined by the appended claims.

APPENDIX A

BOOL getProductName(WCHAR*buffer, short buffer_size, WORD wLangID)

where:
variable "buffer" is used to hold a product name string;
variable "buffer_size" lists the largest number of wide characters to be copied (presumably the same number as the size of the "buffer" variable); and
variable wLangID" holds the binary language-id/code-page pair. In the preferred embodiment, wLangID is not implemented and is therefore set to 0

BOOL getOEMName(WCHAR*buffer, short buffer_size, WORD wLangID)

where:
variable "buffer" is used to hold the OEM name string;
variable "buffer$_{13}$ size" lists the largest number of wide characters to be copied (presumably the same number as the size of the "buffer" string); and variable wLangID" holds the binary language-id/code-page pair. In the preferred embodiment, wLangID is not implements and is therefore set to 0.

BOOL getImage (short iiImageID, HANDLE*phIMageHandle)

where:
variable iiImageID is of type IMAGE_ID and takes a value of either SMALL_LOGO or LARGE_LOGO; and
variable phImageHanldle is a handle pointer that holds an image handle.

BOOL getName(WCHAR*buffer, short buffer_size, WORD wLangID, NAME_TYPE ntName)

where:
the variables "buffer", "buffer_size" and "wLangID" are the same as those called in the first two routines.

We claim:

1. A method for managing and displaying branding data in a computer product including a variety of hardware and software components, said method comprising the steps of:
storing branding data associated with said hardware and software components in a central library;
storing at least one routine to access said branding data in at least one second library, said at least one routine being called by a software application requesting branding data associated with hardware and software components utilized by said software application;
executing a routine in said at least one second library in response to a call made by said software application and extracting the requested branding data from said central library in response thereto; and
displaying the requested branding data in at least one non-modifiable field of a form of said software application.

2. A method of claim 1 wherein said at least one second library stores a plurality of routines, each of said routines being called to extract different types of branding data from said central library.

3. A method of claim 2 wherein said routines are stored in a single second library.

4. A method of claim 3 wherein said central and second libraries are dynamic link libraries.

5. A method of claim 4 wherein said software application requesting branding data statically or dynamically links to said second library and calls the routines therein to access said branding data.

6. A method of claim 4 wherein said different types of branding data include product names, original equipment manufacturer (OEM) names and images.

7. A method of claim 6 wherein said branding data is stored in a version resource including string resources for said product names and OEM names.

8. A method of claim 7 wherein said images are stored in said version resource in bitmap resources.

9. The method of claim 1 wherein said branding data stored in said central library is modifiable.

10. A method of accessing branding data and displaying said branding data in a computer product including a variety of hardware and software components, in response to a request from a software application, said method comprising the steps of:
linking to a first library storing routines to access branding data stored in a central library in response to said request, said branding data being associated with said hardware and software components;
calling the routines in said first library, said called routines loading said central library and extracting branding data from said central library identified in said request, said extracted branding data being associated with hardware and software components utilized by said software application;
conveying the extracted branding data to said software application; and
displaying the extracted branding data in at least one non-modifiable field of a form generated by said software application.

11. A method of claim 10 wherein said central and first libraries are dynamic link libraries.

12. A method of claim 11 wherein said software application requesting branding data statically or dynamically links to said first library.

13. A method of claim 12 wherein said branding data include product names, original equipment manufacturer (OEM) names, and images.

14. A method of claim 13 wherein said branding data is stored in a version resource in said central library and includes string resources for said product names and OEM names.

15. A method of claim 14 wherein said images are stored in said version resource in bitmap resources.

16. The method of claim 10 wherein said branding data stored in said central library is modifiable.

17. A method of displaying branding data within a graphical user interface generated by a software application comprising the steps of:
storing branding data in a first dynamic link library;
storing a plurality of routines in a second dynamic link library, each routine being associated with related branding data in said first dynamic link library, said routines being called in response to a branding data request made by said software application;
executing the routines when called by said software application to extract the related branding data from said first dynamic link library and conveying the extracted branding data to said software application, said extracted branding data being associated with hardware and/or software components utilized by said software application; and displaying the extracted branding data within non-modifiable areas of said graphical user interface.

18. The method of claim 17 wherein said routines in said second dynamic link library include routines to extract product name, OEM name and image branding data from said first dynamic link library.

19. The method of claim 18 wherein said branding data is stored in said first dynamic link library as strings.

20. In a computer product including a processing unit executing a software application stored in memory and a display to present a graphical form within a window in response to execution of said software application, a branding data management application comprising:

a first library storing branding data associated with said software application; and a second library storing a plurality of routines, each routine being associated with related branding data in said first library, said routines being called by said software application and being executed by said processing unit when called thereby to extract the related branding data from said first library and convey said related branding data to said software application, said extracted branding data being associated with hardware and software components utilized by said software application, said software application including said related branding data in non-modifiable areas of said graphical form presented by said display.

21. A branding data management application according to claim 20 wherein said first and second libraries are dynamic link libraries.

22. A branding data management application according to claim 21 wherein the routines in said second library include routines to extract product name, OEM name and image branding data from said first library.

23. A branding data management application according to claim 22 wherein the branding data is stored in said first library as strings.

* * * * *